United States Patent
Tilly

(10) Patent No.: US 12,555,130 B1
(45) Date of Patent: Feb. 17, 2026

(54) SYSTEM AND METHOD OF LOST SALES CORRECTION FOR PROMOTED PERIODS

(71) Applicant: Blue Yonder Group, Inc., Scottsdale, AZ (US)

(72) Inventor: Philippe Jean-Marc Tilly, Scottsdale, AZ (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 249 days.

(21) Appl. No.: 18/142,979

(22) Filed: May 3, 2023

Related U.S. Application Data

(60) Provisional application No. 63/412,274, filed on Sep. 30, 2022, provisional application No. 63/351,148, filed on Jun. 10, 2022.

(51) Int. Cl.
*G06Q 10/00* (2023.01)
*G06Q 30/0202* (2023.01)

(52) U.S. Cl.
CPC .............................. *G06Q 30/0202* (2013.01)

(58) Field of Classification Search
None
See application file for complete search history.

(56) References Cited

U.S. PATENT DOCUMENTS

| | | | | |
|---|---|---|---|---|
| 5,819,232 A * | 10/1998 | Shipman | ............ | G06Q 30/0202 705/7.31 |
| 6,418,416 B1 * | 7/2002 | Rosenberg | .............. | G07F 9/002 705/28 |
| 7,092,929 B1 * | 8/2006 | Dvorak | ................... | G06Q 30/00 706/14 |
| 7,155,402 B1 * | 12/2006 | Dvorak | ................ | G06Q 10/087 705/28 |
| 8,321,303 B1 * | 11/2012 | Krishnamurthy | ...... | G06Q 30/02 705/28 |

(Continued)

OTHER PUBLICATIONS

RD Snyder, JK Ord, A Beaumont (Forecasting the intermittent demand for slow-moving inventories: a modelling approach)—International Journal of Forecasting, 2012—Elsevier. (Year: 2012).*

(Continued)

*Primary Examiner* — Hafiz A Kassim
(74) *Attorney, Agent, or Firm* — Spencer Fane LLP; Steven J. Laureanti

(57) ABSTRACT

A system and method are disclosed for correcting lost sales for promotional periods. The method includes computing an average daily proportion of sales within calendar weeks for products, computing an expected range comprising a minimum and a maximum expected share for each day for the products, comparing historical daily shares with the expected ranges for the calendar weeks, determining a reference day for each calendar week by determining which day of each week represented by the historical daily shares falls closest to an expected value for the day, and correcting days falling outside the expected range using the reference day determined by calculating corrected sales values using the reference day, where calculating the corrected sales values further comprises determining a reference ratio for the day to be corrected by dividing an average value for the day by an average value for the reference day.

14 Claims, 13 Drawing Sheets

(56) References Cited

U.S. PATENT DOCUMENTS

| | | | | |
|---|---|---|---|---|
| 2002/0188499 | A1* | 12/2002 | Jenkins | G06Q 10/087 705/28 |
| 2005/0256759 | A1* | 11/2005 | Acharya | G06Q 30/02 705/7.31 |
| 2007/0112651 | A1* | 5/2007 | Swan | G06Q 10/087 705/28 |
| 2008/0077459 | A1* | 3/2008 | Desai | G06Q 30/02 705/7.29 |
| 2009/0307034 | A1* | 12/2009 | Duff | G06Q 10/04 707/999.107 |
| 2010/0185499 | A1* | 7/2010 | Dwarakanath | G06Q 10/04 705/7.31 |
| 2017/0068973 | A1* | 3/2017 | Sinkel | G06Q 30/0201 |
| 2017/0169446 | A1* | 6/2017 | Li | G06Q 30/0202 |

OTHER PUBLICATIONS

Y Kang, SB Gershwin et al. (Information inaccuracy in inventory systems: stock loss and stockout), IIE transactions, 2005.Taylor & Francis (Year: 2005).*

Alankrita Nigam, "Product Promotion Effectiveness: Root Causes of Stock-Outs," Master of Engineering in Logistics at the Massachusetts Institute of Technology, Jun. 2016.

Patrick Bajari, et al., "Demand Estimation with Machine Learning and Model Combination," Working Paper 20955, National Bureau of Economic Research, Feb. 2015.

* cited by examiner

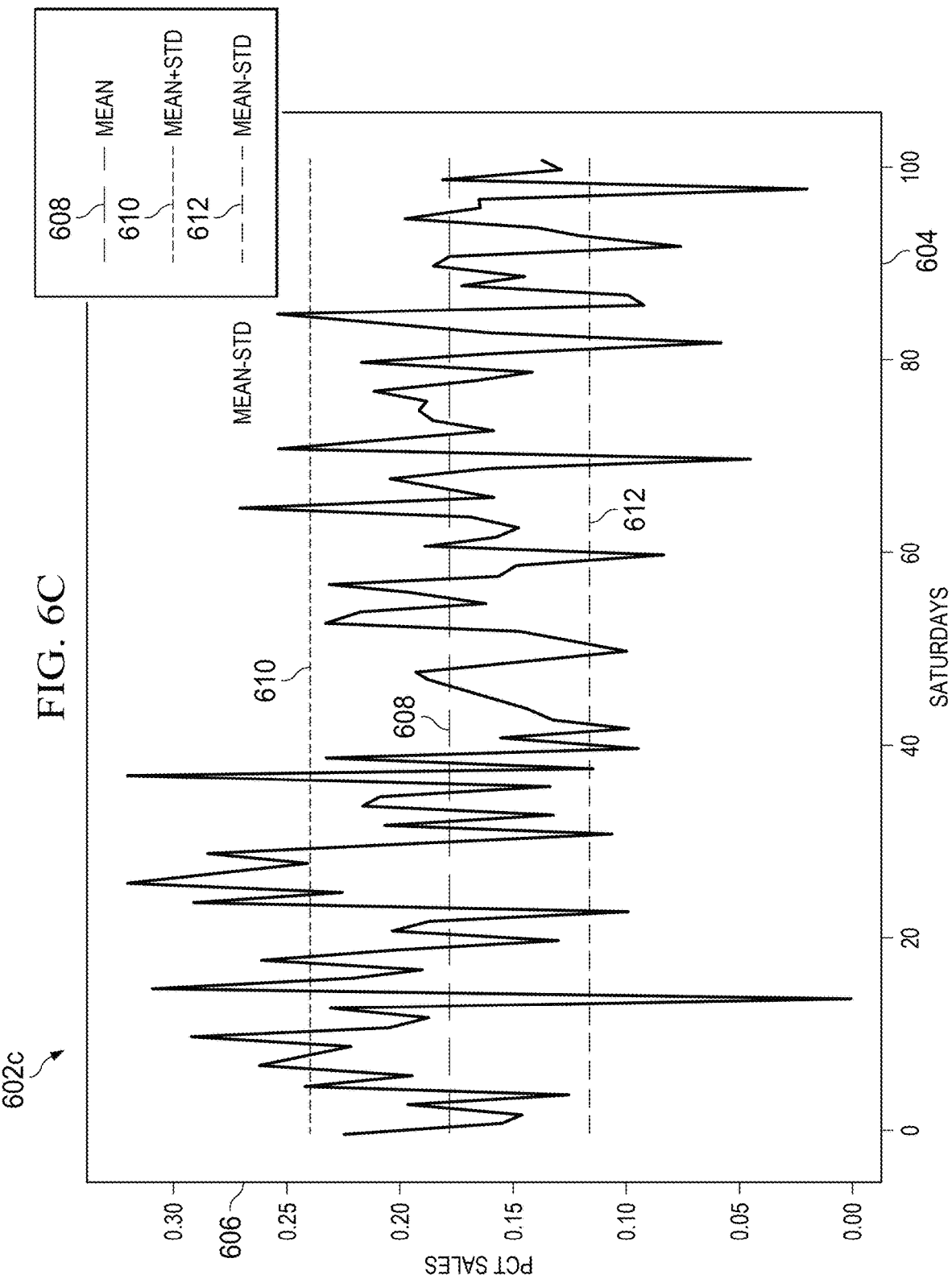

SYSTEM AND METHOD OF LOST SALES CORRECTION FOR PROMOTED PERIODS

CROSS-REFERENCE TO RELATED APPLICATIONS

The present disclosure is related to that disclosed in the U.S. Provisional Application No. 63/351,148, filed Jun. 10, 2022, entitled "Lost Sales Correction for Promoted Periods" and U.S. Provisional Application No. 63/412,274, filed Sep. 30, 2022, entitled "Converting Promotional Forecasts to Support a Single Fulfillment Schedule" U.S. Provisional Application Nos. 63/351,148 and 63/412,274 are assigned to the assignee of the present application. The present invention hereby claims priority under 35 U.S.C. § 119(e) to U.S. Provisional Application Nos. 63/351,148 and 63/412,274.

TECHNICAL FIELD

The present disclosure relates generally to supply chain planning, and more specifically to systems and methods of adjusting sales figures to account for out of stock situations.

BACKGROUND

One important process in supply chain planning is forecasting a level of demand for products within the supply chain network. Past sales are frequently used as an input for the demand forecast. However, when a product is out of stock for a period of time, the true level of demand is not reflected in the past sales. Existing demand forecasting systems attempt to compensate for out of stock situations by flagging a product as out of stock when the product is unavailable at a particular store. However, such flagging may not capture the state of the product inventory for the entire day when the product is only out of stock for a portion of the day, and thus also fails to capture the true level of demand for the product. Existing demand forecasting systems that do not accurately correct input data to account for out of stock situations may produce inaccurate demand forecasts, which may result in additional out of stock situations and prevent timely readjustment of the supply chain network to account for demand changes, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 6A-6G illustrate control charts for a particular product at a particular retail location, in accordance with an embodiment.

DETAILED DESCRIPTION

Figure 1:
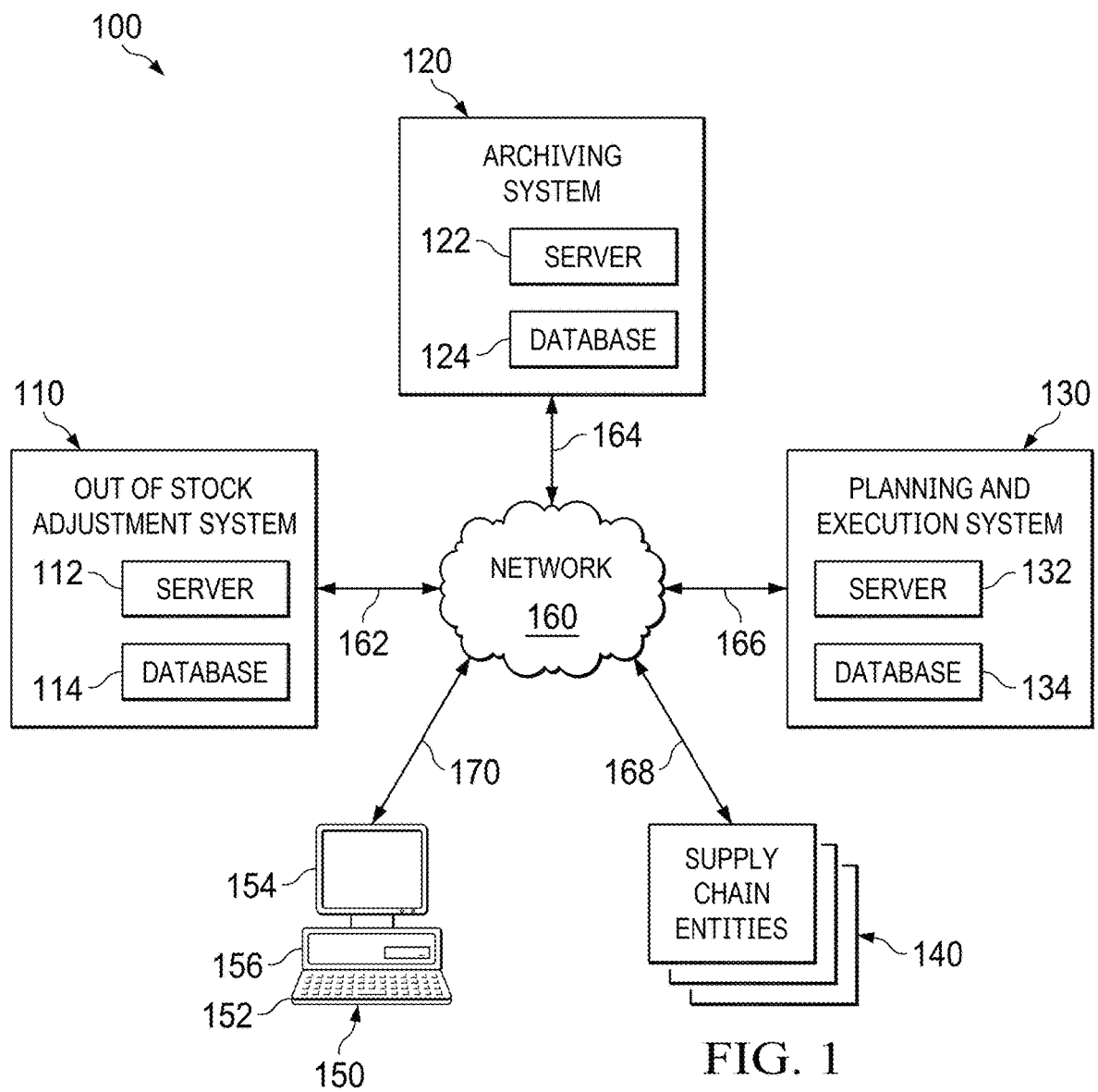
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide an out of stock adjustment system and method that estimate daily shares for products to correct for lost sales within the data due to out of stock (OOS) situations. In an embodiment, the out of stock adjustment system accesses historical sales data to determine a control chart for each day of the week. The OOS situations are adjusted based on a promotional calendar week (for example, from Thursday to Wednesday) rather than an operational calendar week (for example, from Sunday to Saturday) to account for promotional lift on the products. The out of stock adjustment system calculates daily shares for the products according to this promotional calendar week and compares the daily shares with the control charts to determine which days, if any, the products fall outside of the expected ranges. When one of the products fall outside of the expected ranges, the out of stock adjustment system determines a reference day to use for correction, and estimates the historical daily level of demand in terms of units using the reference day. The estimated daily units may be used in demand forecasting.

Embodiments of the following disclosure enable out of stock adjustment systems to correct historical daily sales data to account for OOS situations, which provides more accurate demand forecasts. Use of embodiments allows for significantly improved forecast accuracy compared to existing methods of demand forecasting. Embodiments of the following disclosure may improve the accuracy of any demand forecasting model, as embodiments are model agnostic with respect to the demand forecasting model used. Further, embodiments may adjust the sales figures for both seasonal and non-seasonal items to account for OOS situations and have the capability to handle both slow-moving items and top sellers at the SKU store level.

FIG. 1 illustrates supply chain network 100, in accordance with a first embodiment. Supply chain network 100 comprises out of stock adjustment system 110, archiving system 120, planning and execution system 130, one or more supply chain entities 140, computer 150, network 160, and one or more communication links 162-170. Although a single out of stock adjustment system 110, a single archiving system 120, a single planning and execution system 130, one or more supply chain entities 140, a single computer 150, a single network 160, and one or more communication links 162-170 are shown and described, embodiments contemplate any number of out of stock adjustment systems, archiving systems, planning and execution systems, supply chain entities, computers, networks, or communication links, according to particular needs.

In one embodiment, out of stock adjustment system 110 comprises server 112 and database 114. As described in more detail below, out of stock adjustment system 110 may, in an embodiment, use historical sales data to compute control charts for one or more products, and detect OOS situations within historical daily sales data 222 (FIG. 2) by determining values falling outside of the expected ranges for the control charts. In some embodiments, the OOS situations are adjusted, not in the operational calendar week, but in a promotional calendar week to account for promotional lift on the products, and the out of stock adjustment system calculates daily shares for the products according to this promotional calendar week. Out of stock adjustment system 110 may correct the values falling outside of the expected ranges to generate corrected sales data 228. Further still, the embodiments described below are model-agnostic with respect to the demand forecasting model used, may improve the accuracy of any demand forecasting model, and may have the capability to handle both slow-moving items and top sellers at the SKU store level.

Archiving system 120 of supply chain network 100 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from planning and execution system 130 and/or one or more computers 150 of supply chain network 100. According to some embodiments, archiving system 120 comprises an archive of data received from planning and execution system 130, one or more supply chain entities 140, and/or one or more computers 150 of supply chain network 100. Archiving system 120 provides archived data to out of stock adjustment system 110 and/or planning and execution system 130. Server 122 may store the received data in database 124. Database 124 of archiving system 120 may comprise one or more databases or other data storage arrangements at one or more locations, local to, or remote from, server 122.

According to an embodiment, planning and execution system 130 comprises server 132 and database 134. Supply chain planning and execution are typically performed by several distinct and dissimilar processes, including, for example, demand forecasting, production planning, supply planning, distribution planning, execution, transportation management, warehouse management, fulfillment, procurement, and the like. Server 132 of planning and execution system 130 comprises one or more modules, such as, for example, a forecasting module, planning module 250, a solver, a modeler, and/or an engine, for performing actions of one or more planning and execution processes. Server 132 stores and retrieves data from database 134 or one or more locations in supply chain network 100. In addition, planning and execution system 130 operates on one or more computers 150 that are integral to or separate from the hardware and/or software that support archiving system 120 and out of stock adjustment system 110.

As shown in FIG. 1, supply chain network 100 comprising out of stock adjustment system 110, archiving system 120, planning and execution system 130, and one or more supply chain entities 140 may operate on one or more computers 150 that are integral to or separate from the hardware and/or software that support out of stock adjustment system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from out of stock adjustment system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with out of stock adjustment system 110 and archiving system 120.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein.

In one embodiment, out of stock adjustment system 110 may be coupled with network 160 using communication link 162, which may be any wireline, wireless, or other link suitable to support data communications between out of stock adjustment system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. Computer 150 may be coupled with network 160 using communication link 170, which may be any wireline, wireless, or other link suitable to support data communications between computer 150 and network 160 during operation of supply chain network 100. Although communication links 162-170 are shown as generally coupling out of stock adjustment system 110, archiving system 120, planning and execution system 130, one or more supply chain entities 140, and computer 150 to network 160, any of out of stock adjustment system 110, archiving system 120, planning and execution system 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling out of stock adjustment system 110, archiving system 120, planning and execution system 130, one or more supply chain entities 140, and computer 150. For example, data may be maintained locally to, or externally of, out of stock adjustment system 110, archiving system 120, planning and execution system 130, one or more supply chain entities 140, and one or more computers 150 and made available to one or more associated users of out of stock adjustment system 110, archiving system 120, planning and execution system 130, one or more supply chain entities 140, and one or more computers 150 using network 160 or in any other appropriate manner. For example, data may be maintained in a cloud database at one or more locations external to out of stock adjustment system 110, archiving system 120, planning and execution system 130, one or more supply chain entities 140, and one or more computers 150 and made available to one or more associated users of out of stock adjustment system 110, archiving system 120, planning and execution system 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
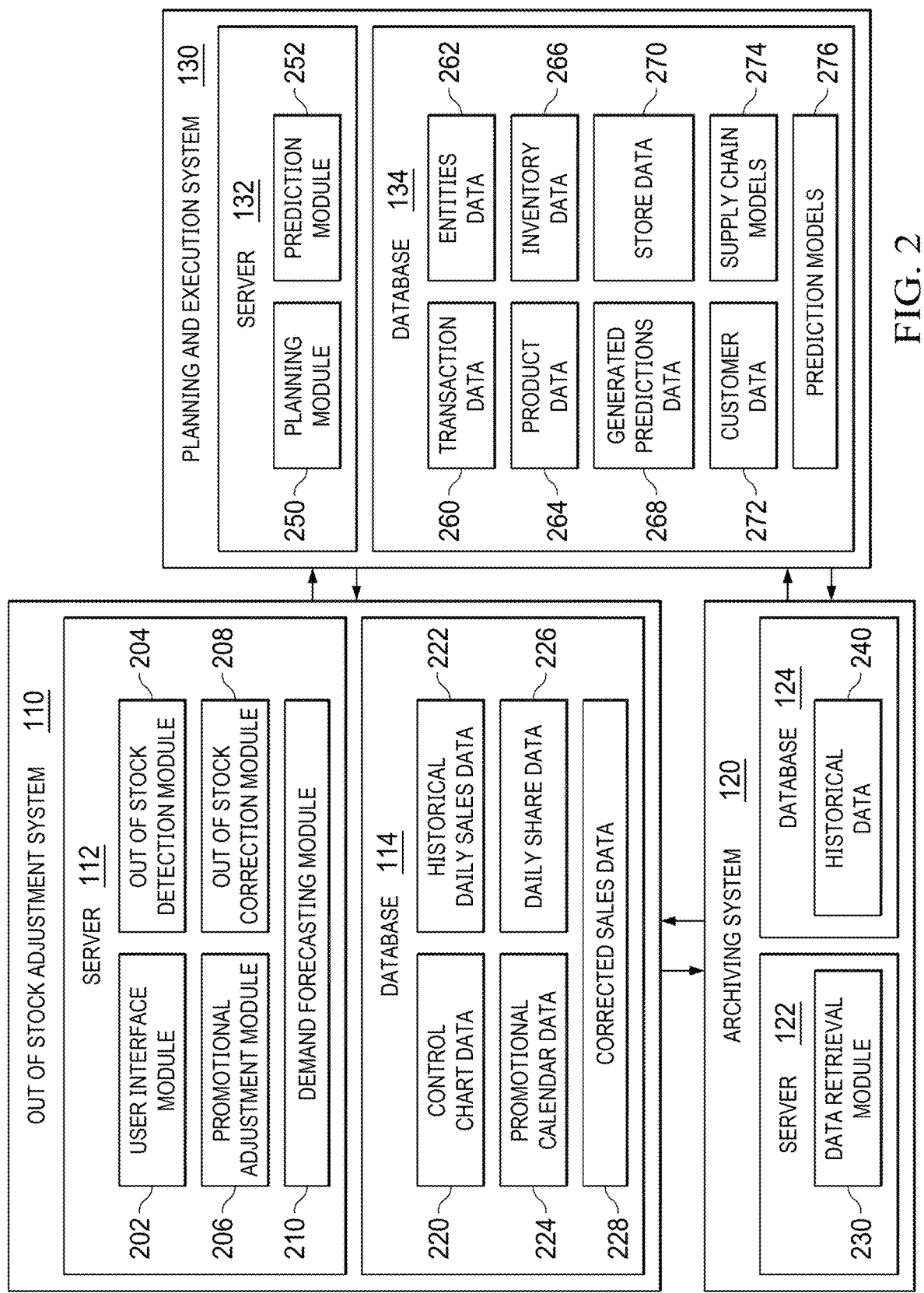
FIG. 2 illustrates the out of stock adjustment system, the archiving system, and the planning and execution system of FIG. 1 in greater detail, in accordance with an embodiment.

FIG. 2 illustrates out of stock adjustment system 110, archiving system 120, and planning and execution system 130 of FIG. 1 in greater detail, in accordance with an embodiment. Out of stock adjustment system 110 may comprise server 112 and database 114, as described above. Although out of stock adjustment system 110 is shown as comprising a single server 112 and a single database 114, embodiments contemplate any suitable number of servers or databases internal to or externally coupled with out of stock adjustment system 110.

Server 112 of out of stock adjustment system 110 comprises user interface module 202, out of stock detection module 204, promotional adjustment module 206, out of stock correction module 208, and demand forecasting module 210. Although server 112 is shown and described as comprising a single user interface module 202, a single out of stock detection module 204, a single promotional adjustment module 206, a single out of stock correction module 208, and a single demand forecasting module 210, embodiments contemplate any suitable number or combination of these located at one or more locations, local to, or remote from out of stock adjustment system 110, such as on multiple servers or computers 150 at one or more locations in supply chain network 100.

Database 114 of out of stock adjustment system 110 may comprise one or more databases or other data storage arrangements at one or more locations, local to, or remote from, server 112. In an embodiment, database 114 of out of stock adjustment system 110 comprises control chart data 220, historical daily sales data 222, promotional calendar data 224, daily share data 226, and corrected sales data 228. Although database 114 of out of stock adjustment system 110 is shown and described as comprising control chart data 220, historical daily sales data 222, promotional calendar data 224, daily share data 226, and corrected sales data 228, embodiments contemplate any suitable number or combination of these, located at one or more locations, local to, or remote from, out of stock adjustment system 110 according to particular needs.

User interface module 202 of out of stock adjustment system 110 generates and displays a user interface (UI), such as, for example, a graphical user interface (GUI), that displays one or more interactive visualizations of corrected and/or uncorrected sales data. According to embodiments, user interface module 202 displays a GUI comprising interactive graphical elements for selecting one or more data, items, stores, and/or customers and, in response to the selection, displays one or more corrected sales data 228 charts or control charts. GUIs displayed by user interface module 202 may be used to accept input from a user, such as, for example, input specifying the details of a promotional calendar for a particular retail location.

Out of stock detection module 204 uses historical daily sales data 222, such as, for example, historical data 240 of archiving system 120 database 124 or transaction data 260 of planning and execution system 130 database 134, to calculate control charts for one or more products of supply chain network 100. Out of stock detection module 204 calculates the control charts by determining average (or expected) values for the product for every day of the week. By way of example only and not by way of limitation, out of stock detection module 204 may calculate the average daily share percentage for every day of the week calculated over each week of available history. According to embodiments, out of stock detection module 204 calculates a mean absolute deviation for all values below the average value and sets a minimum expected value for the day as the average value minus the mean absolute deviation for all values below the average value. Out of stock detection module 204 also calculates a mean absolute deviation for all values above the average value and sets a maximum expected value for the day as the average value plus the mean absolute deviation for all values above the average value. Out of stock detection module 204 stores the generated control charts as control chart data 220. According to embodiments, out of stock detection module 204 generates a separate control chart for each day of the week and every product and location. Out of stock detection module 204 also compares historical daily sales data 222 with control chart data 220 in order to determine on what days and at what locations the daily sales of the one or more products fall outside the minimum expected value or maximum expected value as specified by the control charts.

Promotional adjustment module 206 translates historical daily sales data 222 into a form corresponding to the promotional calendar represented in promotional calendar data 224. According to embodiments, historical daily sales data 222 may be recorded on the basis of an operational calendar for supply chain network 100, which in many cases may be from Monday to Sunday, or from Sunday to Saturday. However, a particular retail location, or region of retail locations, within supply chain network 100 may operate using a promotional calendar with a different span, such as, for example, from Thursday to Wednesday. Promotional adjustment module 206 translates historical daily sales data 222, based on the operational calendar, to translated sales data, based on the promotional calendar. By way of example only and not by way of limitation, promotional adjustment module 206 may split a single week of the operational calendar across two weeks of the promotional calendar into an order containing the promotional lift effect from promotions within the week those promotions ran.

Promotional adjustment module 206 also calculates daily shares for the one or more products using the translated sales data. According to embodiments, promotional adjustment module 206 calculates the daily shares by determining, for a given week within the translated sales data, the percentage of total sales of each day of the week. For example, in a given promotional week where a total of fifty-nine units of a particular product total are sold and fourteen of those units are sold on Monday, the daily share of that product for Monday is $14/59$ or 24%. Because the translated sales data include weeks according to the promotional calendar, assuming a weeklong promotion period, the daily shares calculated by promotional adjustment module 206 include the same promotional lift (if any) for all days of the week of the promotional calendar. Since the daily shares in the promotional calendar may be considered stationary, taking the average of the daily share for every given day over a long period of time, such as, for example, one year, two years, and the like, improves forecast accuracy. In the operational calendar, mixing days that include a promotion with days that do not include the promotion imposes non-stationarity of the daily shares, as the daily shares cannot be meaningfully averaged in this calendar due to the unequal affect of the promotional lift. Promotional adjustment module 206 stores the calculated daily shares as daily share data 226.

When out of stock detection module 204 detects an OOS situation, out of stock correction module 208 determines a day of daily share data 226 to use as a reference day for corrections to days falling outside of the expected range for a particular product. In an embodiment, out of stock correction module 208 determines which day of the historical daily shares falls closest to the expected value for that day, according to the control chart for that day, and uses that day as the reference day for corrections. By way of example only and not by way of limitation, when the historical average daily share value for Mondays according to the control chart is 10% and the daily share for the current Monday falls exactly on 10%, out of stock correction module 208 uses Monday as the reference day. As discussed in further detail below, out of stock correction module 208 uses the reference day to correct days falling outside of the respective expected ranges. Out of stock correction module 208 stores the corrected daily shares as corrected sales data 228.

Demand forecasting module 210 uses corrected sales data 228, as the estimate of historical demand, in order to perform demand forecasting for the one or more products. Because corrected sales data 228 has been adjusted to account for lost sales due to OOS situations, demand forecasting module 210 may, when using this estimate of historical demand as part of its input, calculate more accurate demand forecasts. Demand forecasting module 210 may use any demand forecasting algorithm (such as, for example, machine learning or statistical models) to forecast demand using corrected sales data 228.

Control chart data 220 comprises average or expected daily shares values for the one or more products for each day of the week. Each daily control chart comprises an average daily share value, a minimum expected share value, and a maximum expected share value. Because the control charts comprise daily shares bounded by 0% and 100% (that is, between 0 and 1), as disclosed above, the minimum expected value may be calculated by subtracting the mean absolute deviation for all values below the average value from the daily average share, and the maximum expected value may be calculated by adding the mean absolute deviation for all values above the average value to the daily average share. According to embodiments, out of stock detection module 204 determines that daily shares falling above the maximum expected value or below the minimum expected value are outside of the expected range.

Historical daily sales data 222 comprises unaltered sales data received from one or more supply chain entities 140, such as, for example, a retailer of supply chain network 100. Typically, historical daily sales data 222 is organized according to an operational calendar of supply chain network 100. The operational calendar may be used within supply chain network 100 for various activities, such as, for example, placing orders, but may be different from the promotional calendar used by one or more supply chain entities 140 within supply chain network 100.

Promotional calendar data 224 comprises a promotional calendar for one or more supply chain entities 140, such as, for example, a retailer or group of retailers within supply chain network 100. In many cases, the promotional calendar may begin and end mid-week, for example, from Thursday to Wednesday. In some embodiments, promotional calendar data 224 may be received by a user of out of stock adjustment system 110 via user interface module 202. In other embodiments, out of stock adjustment system 110 may automatically determine the promotional calendar according to one or more detected patterns within sales data.

Daily share data 226 comprises the translated sales data calculated to represent a share of each of the daily sales of the one or more products according to the total sales of the one or more products for the week, which normalizes the effect of the promotional lift. According to embodiments, daily share data 226 further comprises out of expected range data. The out of expected range data comprises one or more historical days that have been determined to be out of the expected range, that is, above the maximum expected value (indicating a greatly-above normal demand) and/or below the minimum expected value (indicating a potential out of stock situation) according to the control charts for the one or more products. The out of expected range data represents the days within daily share data 226 that may require correction to provide sales data that more accurately represents the true demand for the one or more products.

Corrected sales data 228 comprises historical daily sales data 222 after being translated to daily share within the promotional week, and thereafter corrected to account for potential out of stock situations, for the one or more products. Demand forecasting module 210 may use corrected sales data 228 to generate more accurate demand forecasts for the one or more products.

Archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 230. Although server 122 is shown and described as comprising a single data retrieval module 230, embodiments contemplate any suitable number or combination of data retrieval modules located at one or more locations, local to, or remote from archiving system 120, such as on multiple servers or computers 150 at one or more locations in supply chain network 100.

In one embodiment, data retrieval module 230 of archiving system 120 receives historical data 240 from planning and execution system 130 and stores received historical data 240 in archiving system 120 database 124. According to one embodiment, data retrieval module 230 of archiving system 120 may prepare historical data 240 for use as the observed data of out of stock adjustment system 110 by checking historical data 240 for errors and transforming historical data 240 to normalize, aggregate, and/or rescale historical data 240 to allow direct comparison of data received from different planning and execution system 130 and/or one or more other locations local to, or remote from, archiving system 120.

Database 124 of archiving system 120 may comprise one or more databases or other data storage arrangements at one or more locations, local to, or remote from, server 122. Database 124 of archiving system 120 comprises, for example, historical data 240. Although database 124 of archiving system 120 is shown and described as comprising historical data 240, embodiments contemplate any suitable number or combination of data, located at one or more locations, local to, or remote from, archiving system 120, according to particular needs.

Historical data 240 may comprise, for example, weather data, special events data, social media data, calendar data, and the like. In an embodiment, historical data 240 may comprise, for example, historic sales patterns, prices, promotions, weather conditions, and other factors influencing future demand of the number of one or more items sold in one or more stores over a time period, such as, for example, one or more days, weeks, months, or years, including, for example, a day of the week, a day of the month, a day of the year, week of the month, week of the year, a month of the year, special events, paydays, and the like.

As disclosed above, planning and execution system 130 comprises server 132 and database 134. Although planning and execution system 130 is shown as comprising a single server 132 and a single database 134, embodiments contemplate any suitable number of servers or databases internal to or externally coupled with planning and execution system 130.

Server 132 of planning and execution system 130 comprises planning module 250 and prediction module 252.

Although server 132 is shown and described as comprising a single planning module 250 and a single prediction module 252, embodiments contemplate any suitable number or combination of planning modules and prediction modules located at one or more locations local to, or remote from, planning and execution system 130, such as on multiple servers or computers 150 at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 260, entities data 262, product data 264, inventory data 266, generated predictions data 268, store data 270, customer data 272, supply chain models 274, and prediction models 276. Although database 134 of planning and execution system 130 is shown and described as comprising transaction data 260, entities data 262, product data 264, inventory data 266, generated predictions data 268, store data 270, customer data 272, supply chain models 274, and prediction models 276, embodiments contemplate any suitable number or combination of data, located at one or more locations, local to, or remote from, planning and execution system 130, according to particular needs.

In an embodiment, planning module 250 of planning and execution system 130 works in connection with prediction module 252 to generate a plan based on one or more predicted retail volumes, classifications, or other predictions. By way of example only and not of limitation, planning module 250 may comprise a demand planner that generates a demand forecast for one or more supply chain entities 140. By way of a further example, planning module 250 may comprise an assortment planner and/or a segmentation planner that generates product assortments that match causal effects calculated for one or more customers or products by prediction module 252, which may provide for increased customer satisfaction and sales, as well as reducing costs for shipping and stocking products at stores where they are unlikely to sell.

Prediction module 252 of planning and execution system 130 applies samples of transaction data 260, entities data 262, product data 264, inventory data 266, store data 270, customer data 272, and other data to prediction models 276 to generate predictions and predictions data. Prediction module 252 of planning and execution system 130 generates one or more real value predictions and stores them in generated predictions data 268. According to some embodiments, prediction module 252 generates predictions at daily intervals. However, embodiments contemplate longer and shorter prediction phases that may be performed, for example, weekly, twice a week, twice a day, hourly, or the like.

Transaction data 260 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 260 is represented by any suitable combination of values and dimensions, aggregated or unaggregated, such as, for example, sales per week, sales per week per location, sales per day, sales per day per season, or the like.

Entities data 262 may comprise data pertaining to one or more entities, including but not limited to supply chain entities 140, manufacturing entities, retailers, distributors, suppliers, or other business entities connected to or affiliated with supply chain network 100. Entities data 262 may include, for example, item data, identifiers, metadata (comprising dimensions, hierarchies, levels, members, attributes, cluster information, and member attribute values), fact data (comprising measure values for combinations of members), business constraints, goals and objectives of one or more business entities.

Product data 264 of database 134 may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 134 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 266 in database 134, which may be used by planning and execution system 130 to place orders, set inventory levels at one or more stocking points, initiate manufacturing of one or more components, or the like in response to, and based at least in part on, a forecasted demand of out of stock adjustment system 110.

Generated predictions data 268 of database 134 may comprise one or more real value predictions generated by prediction module 252 of planning and execution system 130. One example for such generated predictions is demand forecasts, indicating future expected demand based on, for example, any data relating to past sales, past demand, purchase data, promotions, events, or the like of one or more supply chain entities 140 and/or one or more business entities. The demand forecasts may cover a time interval such as, for example, by the minute, hour, daily, weekly, monthly, quarterly, yearly, or any other suitable time interval, including substantially in real-time.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data.

Customer data 272 may comprise customer identity information, including, for example, customer relationship management data, loyalty programs, and mappings between product purchases and one or more customers so that a customer associated with a transaction may be identified. Customer data 272 may comprise data relating customer purchases to one or more products, geographical regions, store locations, or other types of dimensions.

Supply chain models 274 of database 134 comprise characteristics of a supply chain set up to deliver the customer expectations of a particular customer business model. These characteristics may comprise differentiating factors, such as, for example, MTO (Make-to-Order), ETO (Engineer-to-Order) or MTS (Make-to-Stock). However, supply chain models 274 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for, by particular customers. Each of these characteristics may lead to a different supply chain model. Prediction models 276 comprise one or more models used by planning and execution system 130 for predicting real values, including but not limited to, pricing, targeting, or retail volume, such as, for example, a forecasted demand volume for one or more products at one or more stores of one or more retailers based on the prices of the one or more products.

Figure 3:
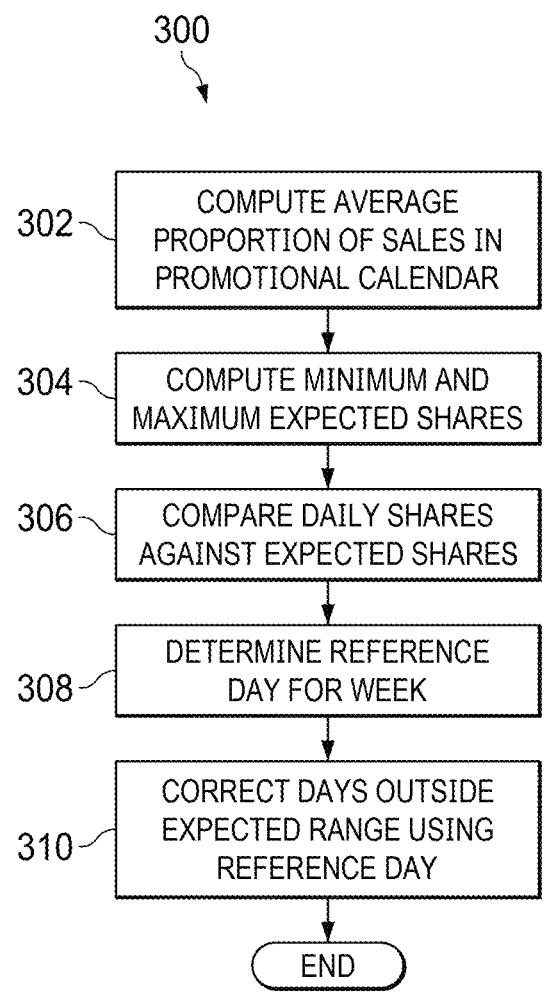
FIG. 3 illustrates a method of lost sales correction, in accordance with an embodiment.

FIG. 3 illustrates method 300 of lost sales correction, in accordance with an embodiment. Method 300 comprises one or more activities, which although described in a particular order may be implemented in one or more combinations, according to particular needs.

At activity 302, promotional adjustment module 206 of out of stock adjustment system 110 computes an average daily proportion of sales within promotional calendar weeks for one or more products. According to embodiments, promotional adjustment module 206 translates the current sales into the promotional calendar in use for a retailer or retailer group selling the one or more products, and thereafter computes the average daily shares, or average proportion of sales, over the number of historical weeks for every day of the week for the one or more products. That is, the average daily shares calculated by promotional adjustment module 206 add up to, in total, 100%.

At activity 304, out of stock detection module 204 of out of stock adjustment system 110 computes the minimum expected share and maximum expected share for each day of the week for the one or more products. According to embodiments, out of stock detection module 204 computes the minimum expected share and maximum expected share using historical daily sales data 222 of supply chain network 100.

At activity 306, out of stock detection module 204 of out of stock adjustment system 110 compares the historical daily shares computed at promotional adjustment module 206 with the respective daily ranges computed at activity 304 for the available historical weeks. According to embodiments, out of stock detection module 204 may determine which days include daily shares for the products falling outside the expected ranges. Historical shares falling below the minimum expected share may indicate days that an OOS situation occurred, indicating that lost sales due to the OOS situation caused the sales data to deviate from the actual demand for the one or more products.

At activity 308, out of stock correction module 208 of out of stock adjustment system 110 determines a reference day for the week. According to embodiments, out of stock correction module 208 may determine which day of the week represented by the daily shares falls closest to the expected value, or expected share for that day. As the determined reference day may thus be the best indicator of actual demand for the one or more products within that week, correction based on the daily share of the reference day may result in corrected sales falling most closely in line with the true demand for the one or more products.

Figure 7:
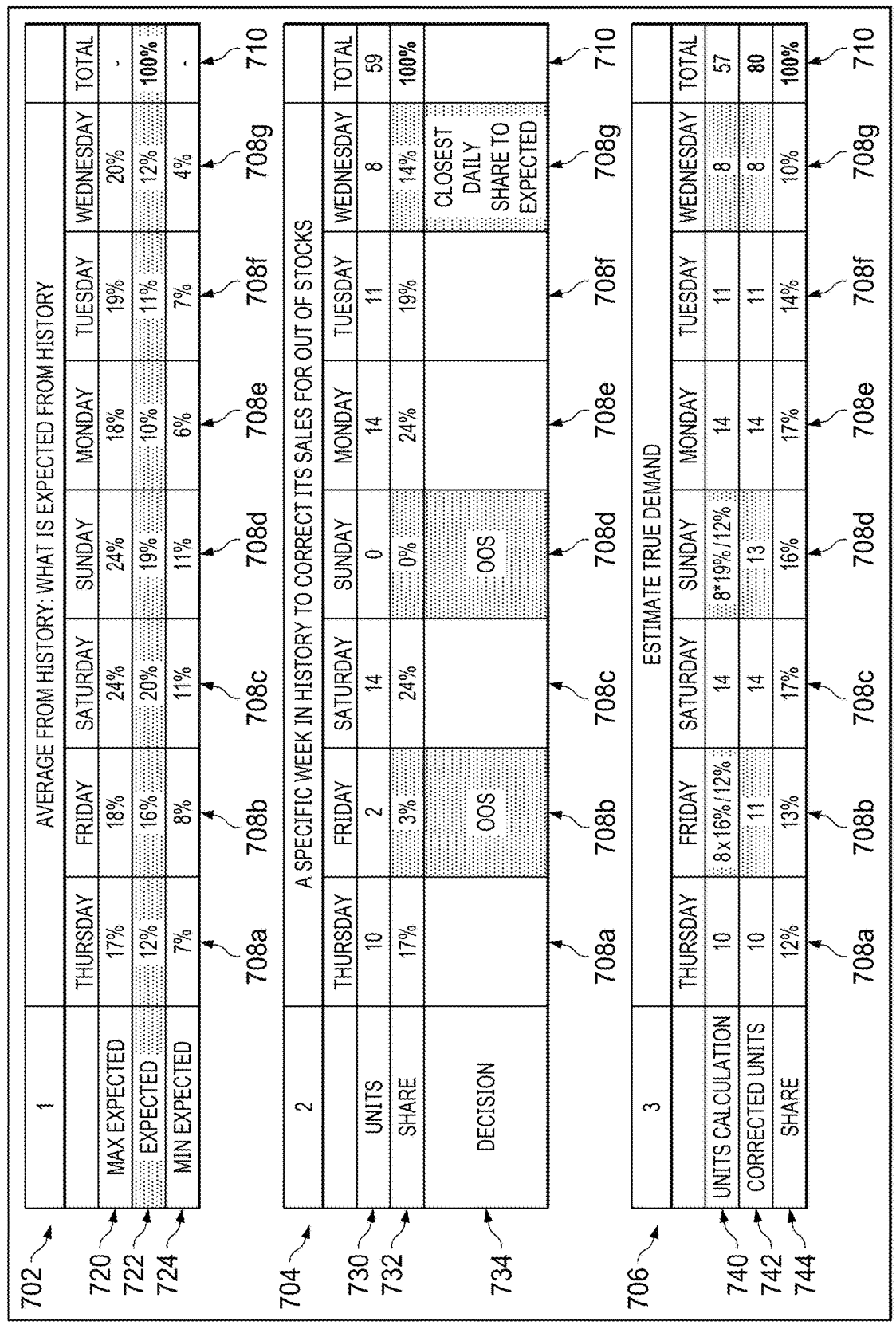
FIG. 7 illustrates a corrected sales graphical user interface, in accordance with an embodiment.

At activity 310, out of stock correction module 208 of out of stock adjustment system 110 corrects days falling outside the expected range using the reference day determined at activity 308. According to embodiments, out of stock correction module 208 may calculate a corrected sales value using the reference day by determining a reference ratio for the day to be corrected by dividing the average value for that day by the average value for the reference day. Out of stock correction module 208 determines the correct units for the one or more days to be corrected by taking the reference ratio for the day and multiplying the reference ratio with the actual historical sales for the reference day. Using the corrected units for the one or more days falling outside the expected range, out of stock correction module 208 re-calculates daily shares for each day of the week. An example of correcting sales data falling outside the expected range is shown in corrected sales GUI 700 (FIG. 7).

In some embodiments, out of stock adjustment system 110 may apply a sales threshold in order to prevent adjustment to slow-moving items, such as, for example, expensive items that sell relatively infrequently. For example, when a particular product has a median sales value across the previous two years of sales history below two units, there may be many days with no sales of that product within the sales data. In such a case, it may be difficult to distinguish between genuine out of stock situations and days where there are no sales of the product.

In some embodiments, out of stock adjustment system 110 may rely on previous forecasts for the week to generate corrected sales figures. For example, when a product is out of stock for an entire week, the sales for every day are zero, and a reference day cannot be calculated for that week. In such a case, out of stock adjustment system 110 may retrieve a previous forecast for the week to use for calculating the projected shares for each day and correct the sales according to the calculated projected shares. Thus, out of stock adjustment system 110 may correct sales figures when a product remains out of stock for an entire promotional week or longer. Embodiments apply equally well to seasonal and non-seasonal items, full- or partial-day OOS situations, and support any forecasting engine with available daily sales data.

Figure 4:
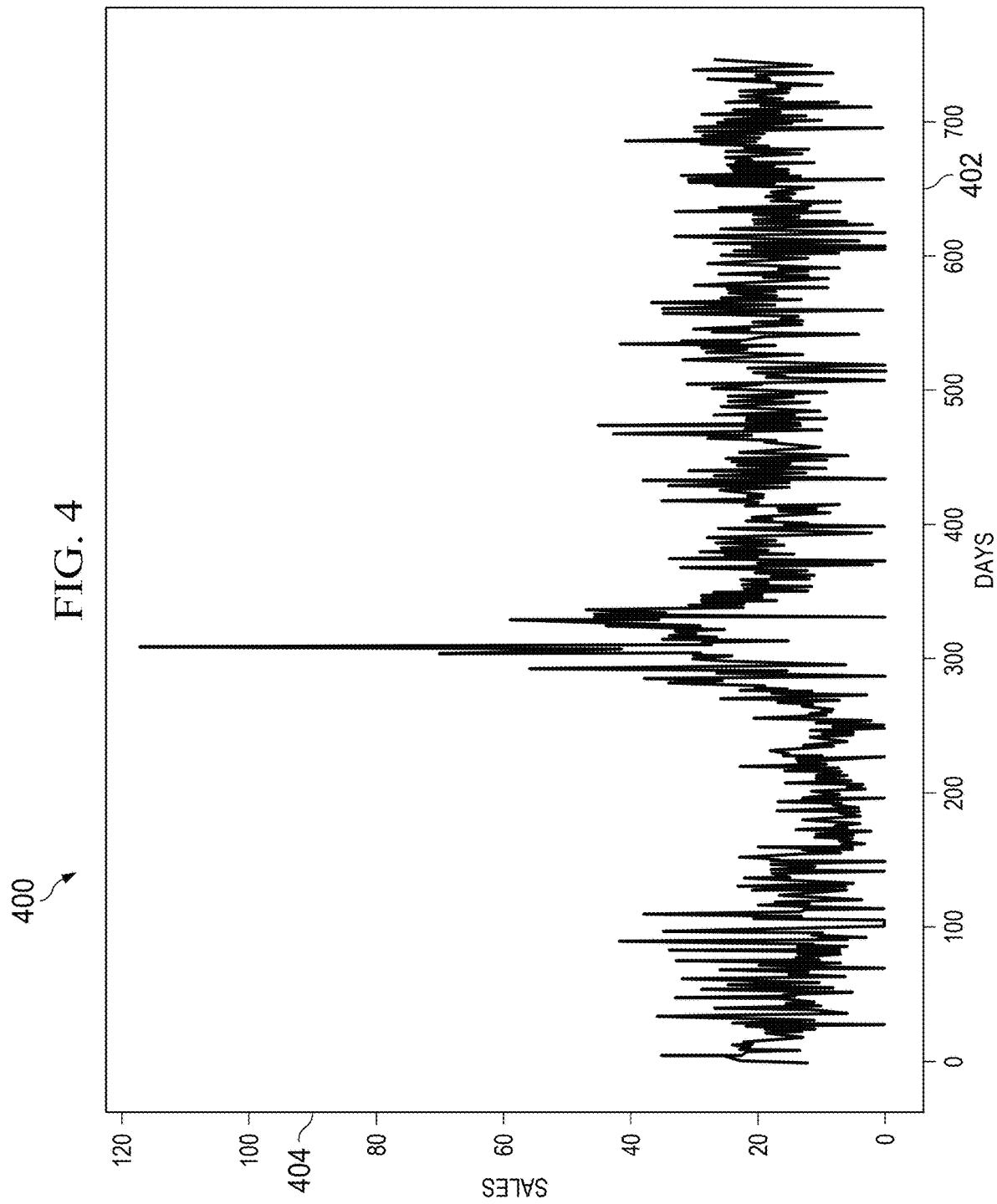
FIG. 4 illustrates a sales chart for a particular product at a particular retail location, in accordance with an embodiment.

FIG. 4 illustrates sales chart 400 for a particular product at a particular retail location, in accordance with an embodiment. In this example, the product is identified by product ID 62180, and the retail location is identified by store ID 52. X-axis 402 of sales chart 400 represents days within the historical sales data from zero to approximately seven hundred fifty, or roughly two years. Y-axis 404 of sales chart 400 represents sales on a particular day from zero to one hundred twenty. Sales chart 400 represents uncorrected sales data, that is, that has not corrected to account for OOS situations. Although FIG. 4 represents sales chart 400 in a particular configuration, user interface module 202 may generate sales charts in various configurations according to particular needs.

The sales data represented in sales chart 400 may be subject to various seasonal patterns, trends and strong promotional lift effects. In sales chart 400, the sales of product 62180 exhibit strong seasonality, for example, around day three hundred twenty where there is a large spike in daily sales. Other cyclical patterns are apparent in sales chart 400, such as, for example, the small spikes throughout that may have been triggered by promotional activity. Sales chart 400 also shows that daily sales of zero units are frequently recorded throughout the dataset, indicating OOS situations or no sales within the sales history. Such features make the uncorrected sales data presented in sales chart 400 unsuitable for use in demand forecasting. However, the daily proportion of sales for any given promotional week remains approximately constant. These weekly-day proportions are stationary in any promoted weeks, and when translated to a promotional calendar, may be used by out of stock correction module 208 to generate corrected sales data 228.

Figure 5:
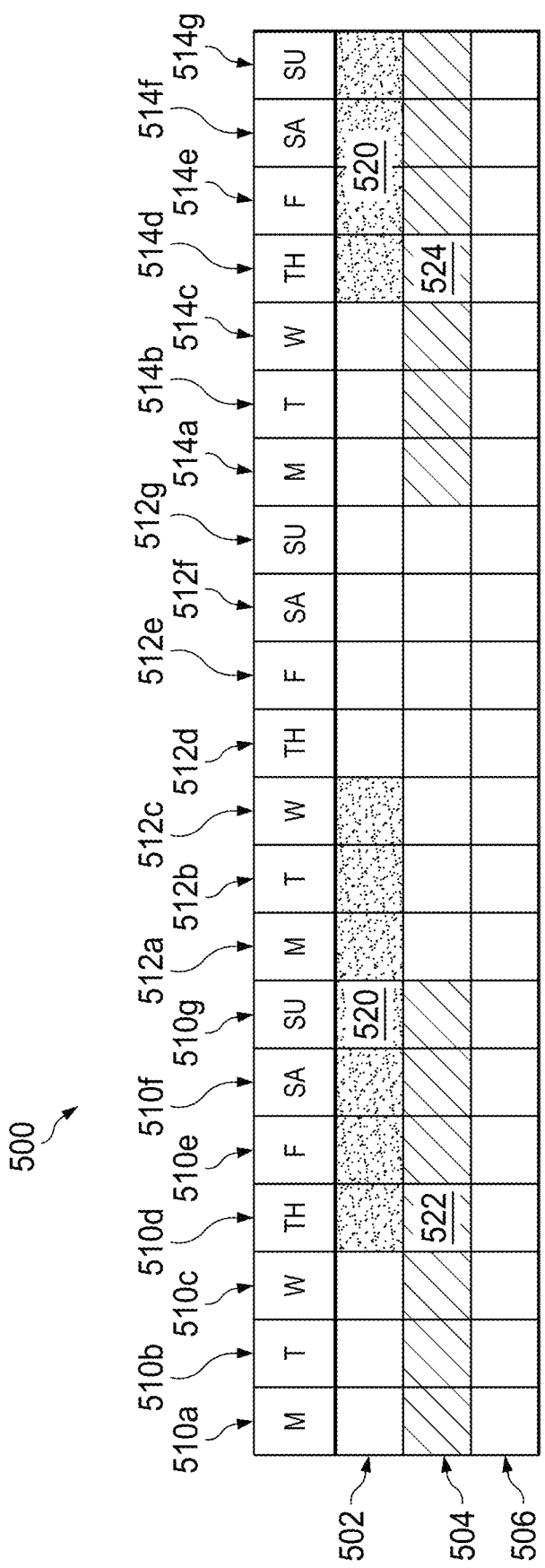
FIG. 5 illustrates a promotional calendar reference, in accordance with an embodiment.
Figure 6A:
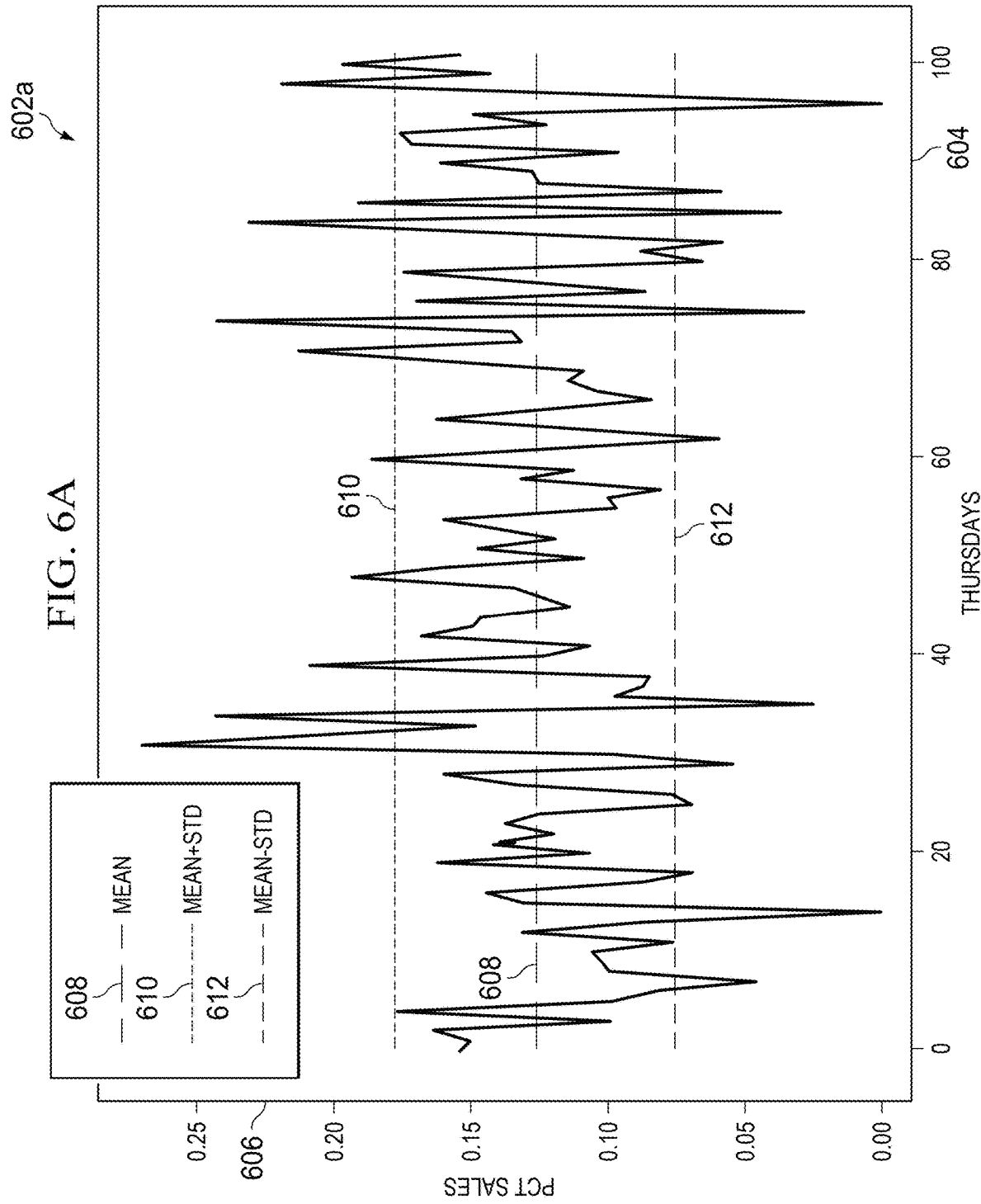
Figure 6B:
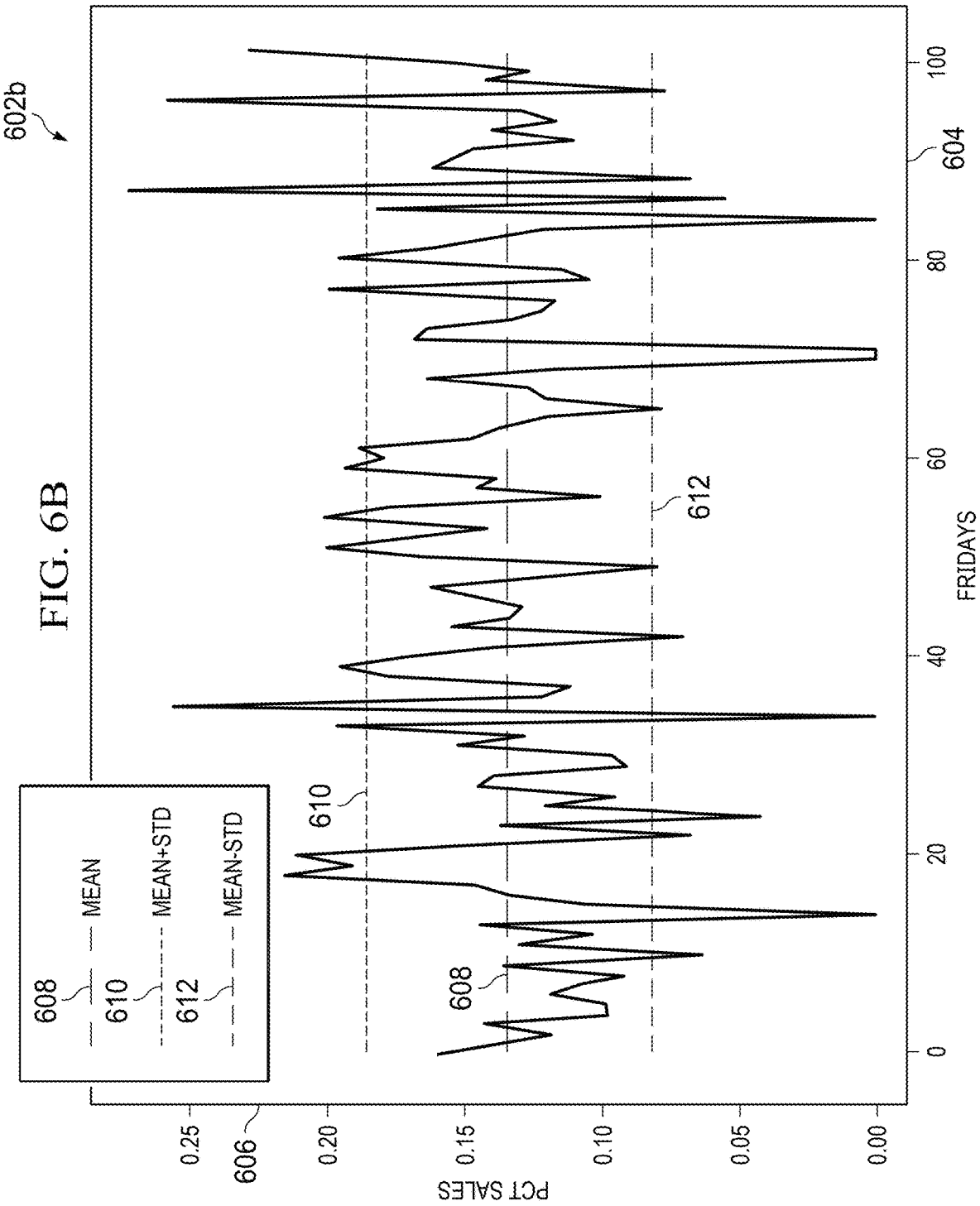
Figure 6D:
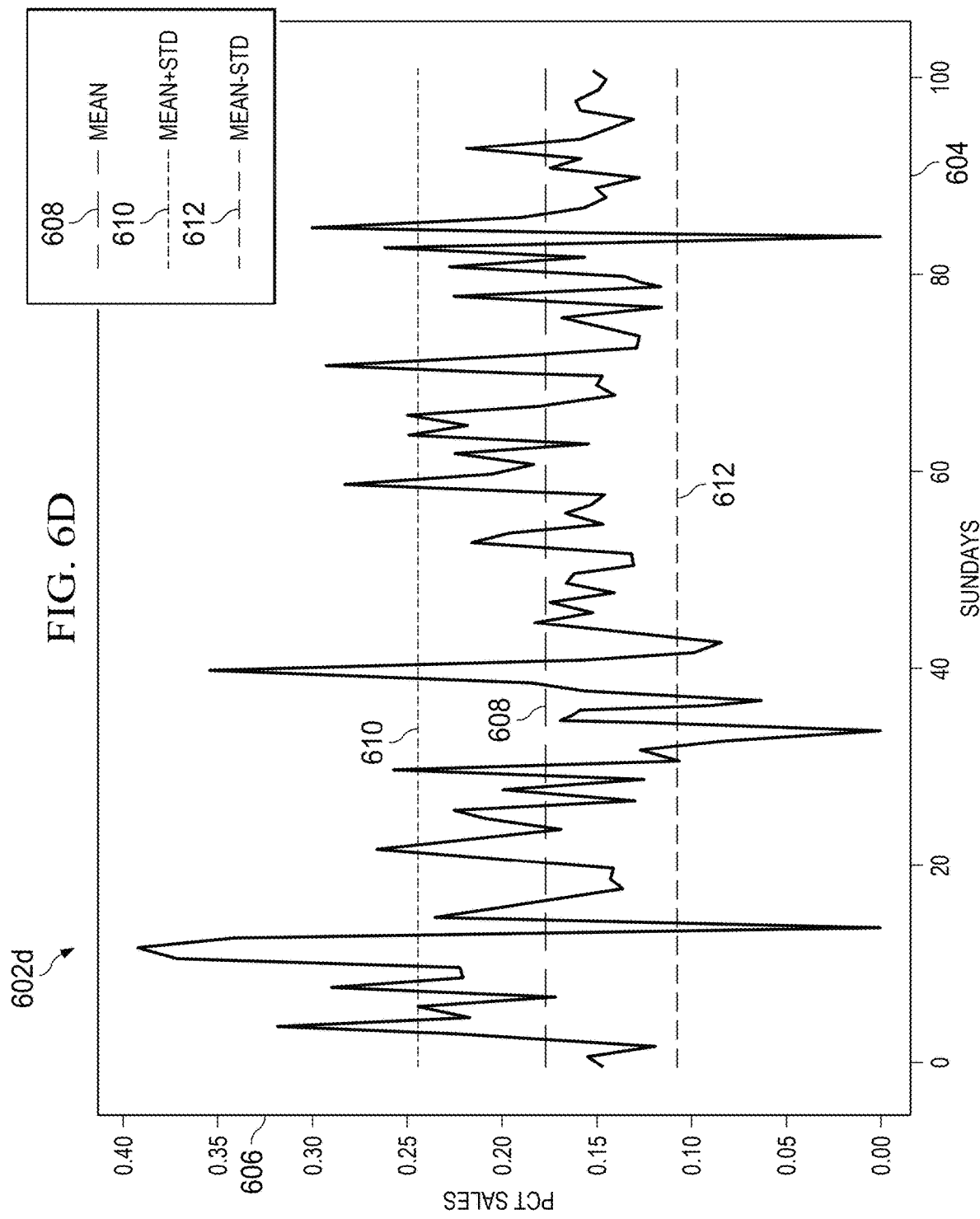
Figure 6E:
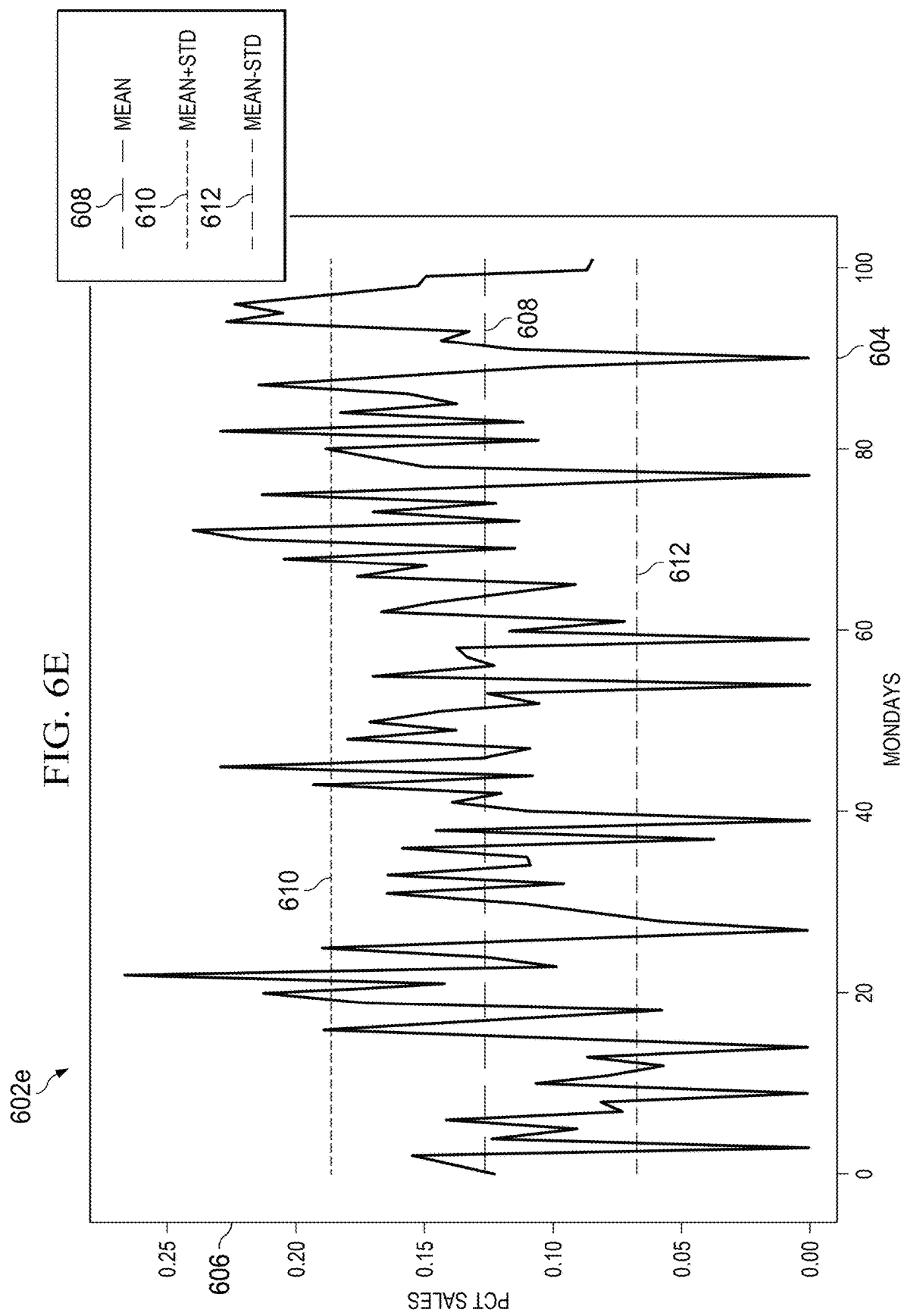
Figure 6F:
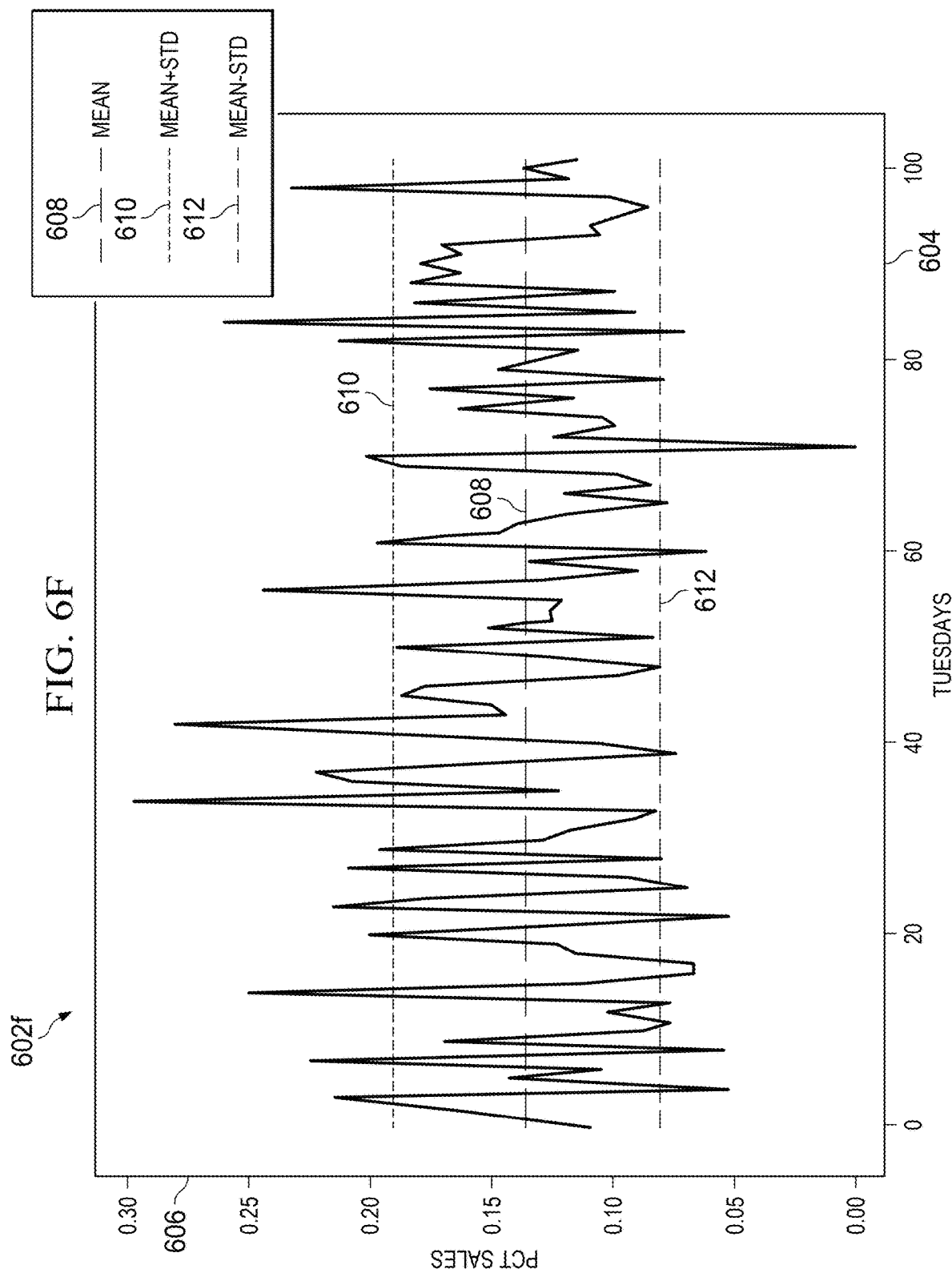
Figure 6G:
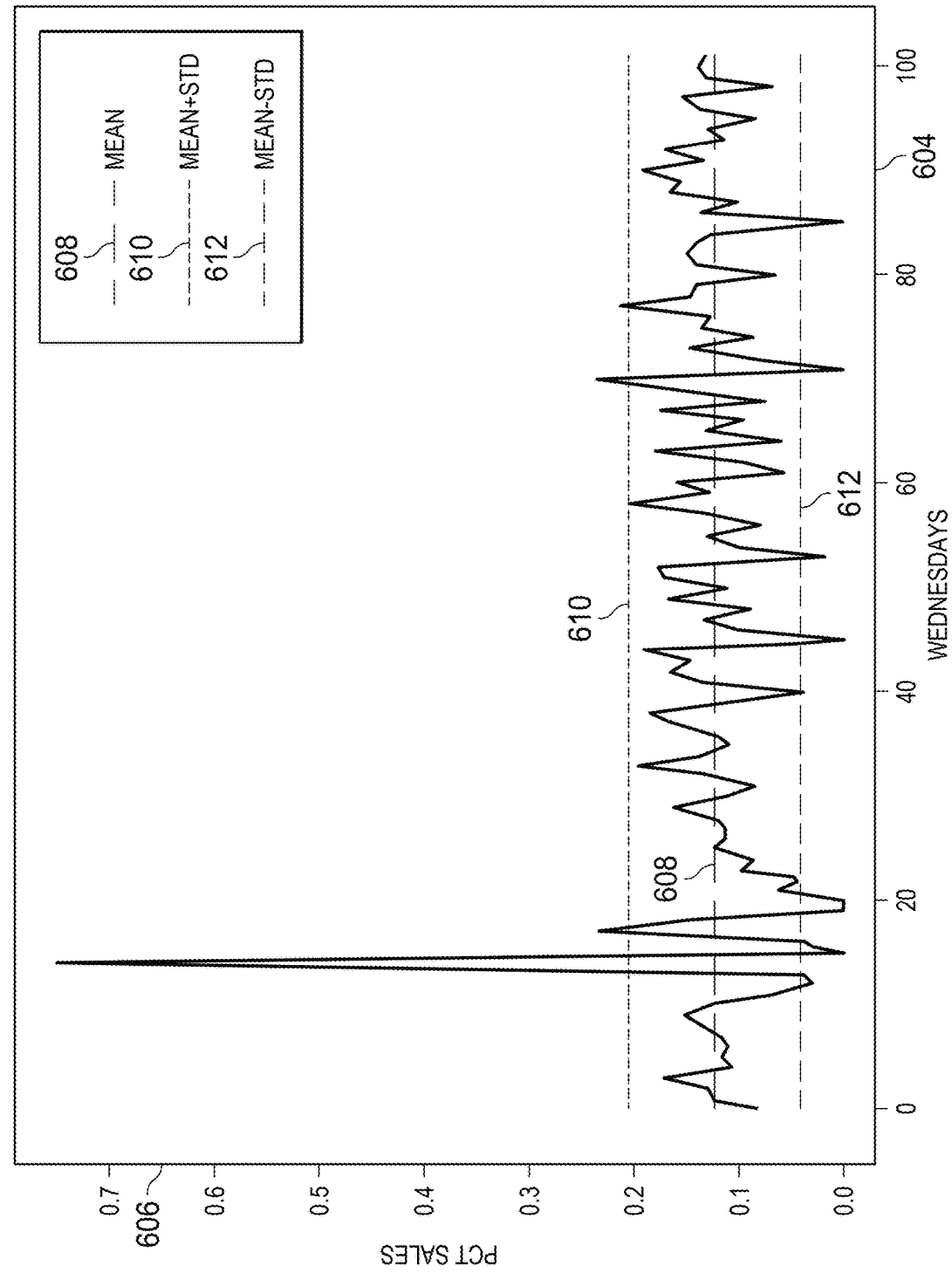

FIG. 5 illustrates promotional calendar reference 500, in accordance with an embodiment. Promotional calendar reference 500 comprises days for three weeks (first week 510a-510g, second week 512a-512g, and third week 514a-514g) for two calendars 502-504. In this example, shaded portions 520 of first calendar 502 represent promotional days running from Thursdays to Wednesdays, while shaded portions 522 of second calendar 504 represent operational days running from Mondays to Sundays. Use of data organized according to second calendar 504 combines days with non-promoted sales (in this example, Monday 510a, Tuesday 510b, and Wednesday 510c) with days with promoted sales (in this example, Thursday 510d through Sunday 510g) in its total weekly sales. Use of such data means that every daily share depends on the particular promotional lift, that is, whether a promotion is running on that day or not. In turn, daily share values greatly vary from week to week, since promotional and non-promotional days are mixed.

In this example, a share for Monday 510a is calculated according to second calendar 504 by adding the sales from Monday 510a to Sunday 510g, and then dividing the sales for Monday 510a by this combined total. However, because Thursday 510d through Sunday 510g are subject to a promotion, these days may include greater sales figures, resulting in a lower daily share for Monday 510a through Wednesday 510c, which may not represent the true demand for the products. A share for Monday 512a is similarly impacted as the daily sales for Monday 512a through Wednesday 512c may be artificially inflated due to the promotion relative to the daily sales for Thursday 512d through Sunday 512g.

When translated to first calendar 502, however, the sales are normalized to account for the promotions, as the share for Thursday 510d includes only days within the same promotional week (Thursday 510d through Wednesday 512c), and subject to the same promotional lift effect.

FIGS. 6A-6G illustrate control charts 602a-602g for a particular product at a particular retail location, in accordance with an embodiment. Following the example of FIG. 4, the product is identified by product ID 62180, and the retail location is identified by store ID 52. FIGS. 6A-6G illustrate seven control charts 602a-602g, one for each day of the week (Thursday control chart 602a (FIG. 6A), Friday control chart 602b (FIG. 6B), Saturday control chart 602c (FIG. 6C), Sunday control chart 602d (FIG. 6D), Monday control chart 602e (FIG. 6E), Tuesday control chart 602f (FIG. 6F), and Wednesday control chart 602g (FIG. 6G)). In this example, control charts 602a-602g are created by out of stock detection module 204 using the same sales data of sales chart 400 of FIG. 4. X-axis 604 of control charts 602a-602g represents a week number. Y-axis 606 of control charts 602a-602g represents a daily units share (percentage of sales). Mean 608 of control charts 602a-602g represents average value of the daily shares for each chart, while mean plus standard deviation (mean+std) 610 and mean minus standard deviation (mean-std) 612 represent the maximum expected value and the minimum expected value, respectively.

Recalling sales chart 400 of FIG. 4, a large spike in sales is shown at approximately day three hundred twenty. Thursday control chart 602a shows that on week forty-six, which is approximately day three hundred twenty according to FIG. 4, there is no corresponding spike in daily share because the lift due to promotions or seasonal effects is removed by translating the sales data into the promotional calendar. Similarly, translating the operational calendar sales data to the promotional calendar to calculate the daily shares has a stabilizing effect on the daily shares.

FIG. 7 illustrates corrected sales GUI 700, in accordance with an embodiment. Corrected sales GUI 700 comprises control table 702, current sales table 704 and corrected sales table 706 for each day of the week 708a-708g and weekly totals 710. Although FIG. 7 represents corrected sales GUI 700 in a particular configuration, user interface module 202 may generate corrected sales GUIs in various configurations according to particular needs.

Control table 702 comprises maximum expected values 720, average (expected) values 722, and minimum expected values 724 computed by out of stock adjustment system 110 at activities 302 and 304, as disclosed above, for a product from Thursday 708a to Wednesday 708g and weekly totals 710. For example, for the product, maximum expected value 720 on Thursday 708a is 17%, while minimum expected value 724 is 7% and average value 722 is 12%.

Current sales table 704 shows actual sales (units) 730 for the product on each day, share 732 of total sales that those sales represent, and the status (decision) 734 of the sales. In this example, actual sales 730 of the product is two units for a 3% share 732 on Friday 708b, below minimum expected value 724 of 8% according to control chart table 702. Similarly, actual sales 730 for the product is zero units 730 for a 0% share 732 on Sunday 708d, below minimum expected value 724 of 11% according to control chart table 702. Accordingly, at activity 306 out of stock detection module 204 determines that Friday 708b and Sunday 708d represent OOS situations for the product. Wednesday 708g has a 14% share 732, 2% off expected average value 722 of 12% for Wednesday 708g, so at activity 308 out of stock correction module 208 determines Wednesday 708g to be the reference day for correcting the shares for Friday 708b and Sunday 708d.

Corrected sales table 706 shows calculation (units calculation) 740 used by out of stock correction module 208 at activity 310 for correcting Friday 708b and Sunday 708d, corrected units 742 for Friday 708b and Sunday 708d according to this calculation, and recalculated shares (share) 744 including corrected shares 742 for Friday 708b and Sunday 708d. In this example, out of stock correction module 208 multiplies actual sales 730 on Wednesday 708g, eight, by average share 722 for the OOS days (16% for Friday 708b and 19% for Sunday 708d), and divides this total by 12%, expected value 722 for Wednesday 708g. The resulting number for Friday 708b (10.67) is rounded up to eleven, while the resulting number for Sunday 708d (12.67) is rounded up to thirteen. Out of stock correction module 208 uses corrected units 742 to re-calculate recalculated shares 744 for each of days 708a-708g, whereby Friday 708b results in a 13% recalculated share 744 and Sunday 708d results in a 16% recalculated share 744. After correction, the daily share for each day is within the expected range. The sales figures for Friday 708b and Sunday 708d are due to OOS situations, and the corrected sales figures represent a demand closer to the actual demand for the product, and result in a more accurate demand value when used in a demand forecasting model. Embodiments of the system and method disclosed are model-agnostic and have improved the accuracy by 9% over 1.2 million forecasts compared to other correction methods relying on a model forecast.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for lost sales correction, comprising:

computing, by a computer comprising a processor and memory, an average daily proportion of sales within one or more calendar weeks for one or more products;

computing, by the computer, an expected range comprising a minimum expected share and a maximum expected share for each day of the one or more calendar weeks for the one or more products, wherein the expected range is based on a standard deviation;

comparing, by the computer, historical daily shares with the expected ranges for the one or more calendar weeks;

determining, by the computer, a reference day for each calendar week by determining which day of each week of the one or more calendar weeks represented by the historical daily shares falls closest to an expected value for the day of each week of the one or more calendar weeks;

correcting, by the computer, days falling outside the expected range using the reference day determined by calculating one or more corrected sales values using the reference day, wherein calculating the one or more corrected sales values further comprises determining a reference ratio for a day to be corrected by dividing an average value for the day by an average value for the reference day;

calculating, by the computer, a mean absolute deviation for values above an average value;

setting, by the computer, a maximum expected value for a day as the average value plus the mean absolute deviation for all values above the average value;

generating, by the computer, a graphical user interface that displays in real time one or more interactive visualizations of one or more corrected sales values;

displaying, by the computer, the graphical user interface comprising an interactive graphical element to allow user selection of one or more data, items, stores, and/or customers;

in response to the user selection, displaying, by the computer, the one or more corrected sales values in control charts, wherein the user selection allows the user via the graphical user interface to accept the one or more corrected sales values; and generating via the computer, the one or more corrected sales values via the graphical user interface in various configurations.

2. The computer-implemented method of claim 1, further comprising:

calculating, by the computer, control charts for the one or more products for each day of a week.

3. The computer-implemented method of claim 1, further comprising:
calculating, by the computer, daily shares for the one or more products by determining, for a given week, a percentage of total sales for each day of a week.

4. The computer-implemented method of claim 1, further comprising:
in response to detecting an out-of-stock situation, determining, by the computer, a day of daily share data to use as a reference day for corrections to days falling outside of an expected range for a particular product.

5. The computer-implemented method of claim 1, further comprising:
performing, by the computer, demand forecasting for the one or more products based at least in part on the one or more corrected sales values.

6. A system for lost sales correction, comprising:
a computer, comprising a processor and memory, the computer configured to:
compute an average daily proportion of sales within one or more calendar weeks for one or more products;
compute an expected range comprising a minimum expected share and a maximum expected share for each day of the one or more calendar weeks for the one or more products, wherein the expected range is based on a standard deviation;
compare historical daily shares with the expected ranges for the one or more calendar weeks;
determine a reference day for each calendar week by determining which day of each week of the one or more calendar weeks represented by the historical daily shares falls closest to an expected value for the day of each week of the one or more calendar weeks;
correct days falling outside the expected range using the reference day determined by calculating one or more corrected sales values using the reference day, wherein calculating the one or more corrected sales values further comprises determining a reference ratio for a day to be corrected by dividing an average value for the day by an average value for the reference days;
calculate a mean absolute deviation for values above an average value;
set a maximum expected value for a day as the average value plus the mean absolute deviation for all values above the average value;
generate a graphical user interface that displays in real time one or more interactive visualizations of one or more corrected sales values;
display the graphical user interface comprising an interactive graphical element to allow user selection of one or more data, items, stores, and/or customers;
in response to the user selection, display the one or more corrected sales values in control charts, wherein the user selection allows the user via the graphical user interface to accept the one or more corrected sales values; and
generate the one or more corrected sales values via the graphical user interface in various configurations.

7. The system of claim 6, wherein the computer is further configured to:
calculate control charts for the one or more products for each day of a week.

8. The system of claim 6, wherein the computer is further configured to:
calculate daily shares for the one or more products by determining, for a given week, a percentage of total sales for each day of a week.

9. The system of claim 6, wherein the computer is further configured to:
in response to detecting an out-of-stock situation, determine a day of daily share data to use as a reference day for corrections to days falling outside of an expected range for a particular product.

10. The system of claim 9, wherein the computer is further configured to:
perform demand forecasting for the one or more products based at least in part on the one or more corrected sales values.

11. A non-transitory computer-readable medium embodied with software for lost sales correction, the software when executed:
computes an average daily proportion of sales within one or more calendar weeks for one or more products;
computes an expected range comprising a minimum expected share and a maximum expected share for each day of the one or more calendar weeks for the one or more products, wherein the expected range is based on a standard deviation;
compares historical daily shares with the expected ranges for the one or more calendar weeks;
determines a reference day for each calendar week by determining which day of each week of the one or more calendar weeks represented by the historical daily shares falls closest to an expected value for the day of each week of the one or more calendar weeks;
corrects days falling outside the expected range using the reference day determined by calculating one or more corrected sales values using the reference day, wherein calculating the one or more corrected sales values further comprises determining a reference ratio for a day to be corrected by dividing an average value for the day by an average value for the reference day
calculates a mean absolute deviation for values above an average value;
sets a maximum expected value for a day as the average value plus the mean absolute deviation for all values above the average value;
generates a graphical user interface that displays in real time one or more interactive visualizations of one or more corrected sales values;
displays the graphical user interface comprising an interactive graphical element to allow user selection of one or more data, items, stores, and/or customers;
in response to the user selection, displays the one or more corrected sales values in control charts, wherein the user selection allows the user via the graphical user interface to accept the one or more corrected sales values; and
generates the one or more corrected sales values via the graphical user interface in various configurations.

12. The non-transitory computer-readable medium of claim 11, wherein the software when executed further:
calculates control charts for the one or more products for each day of a week.

13. The non-transitory computer-readable medium of claim 11, wherein the software when executed further:
calculates daily shares for the one or more products by determining, for a given week, a percentage of total sales for each day of a week.

14. The non-transitory computer-readable medium of claim 11, wherein the software when executed further:
  in response to detecting an out-of-stock situation, determines a day of daily share data to use as a reference day for corrections to days falling outside of an expected range for a particular product.

* * * * *